United States Patent
Yoon et al.

(10) Patent No.: US 10,957,949 B2
(45) Date of Patent: Mar. 23, 2021

(54) BATTERY MODULE HAVING COOLING CHANNEL, AND ASSEMBLING METHOD AND FRAME ASSEMBLY THEREOF

(71) Applicant: LG CHEM, LTD., Seoul (KR)

(72) Inventors: Ji-Su Yoon, Daejeon (KR); Yoon-Koo Lee, Daejeon (KR); Dal-Mo Kang, Daejeon (KR); Sang-Woo Ryu, Daejeon (KR); Jeong-O Mun, Daejeon (KR); Sung-Won Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 155 days.

(21) Appl. No.: 15/781,569

(22) PCT Filed: Sep. 27, 2017

(86) PCT No.: PCT/KR2017/010742
§ 371 (c)(1),
(2) Date: Jun. 5, 2018

(87) PCT Pub. No.: WO2018/062863
PCT Pub. Date: Apr. 5, 2018

(65) Prior Publication Data
US 2019/0334217 A1   Oct. 31, 2019

(30) Foreign Application Priority Data
Sep. 28, 2016   (KR) .................. 10-2016-0124854

(51) Int. Cl.
*H01M 10/613* (2014.01)
*H01M 10/6557* (2014.01)
(Continued)

(52) U.S. Cl.
CPC ....... *H01M 10/613* (2015.04); *H01M 2/0434* (2013.01); *H01M 10/04* (2013.01); *H01M 10/6557* (2015.04)

(58) Field of Classification Search
CPC .............. H01M 10/613; H01M 10/04; H01M 10/6557; H01M 2/04; H01M 2/0434; H01M 2/0207; H01M 2/1072; H01M 10/6556

See application file for complete search history.

(56) References Cited

U.S. PATENT DOCUMENTS 8,911,896 B2   12/2014   Jin
8,974,943 B2    3/2015   Feng
(Continued)

FOREIGN PATENT DOCUMENTS

EP   2 337 143 A2   6/2011
EP   2 497 145 A1   9/2012
(Continued)

OTHER PUBLICATIONS

_Decision_ of KIPO on_Registration_(Translated), Jun. 24, 2020 (Year: 2020).*
(Continued)

*Primary Examiner* — Alexander Usyatinsky
(74) *Attorney, Agent, or Firm* — Birch, Stewart, Kolasch & Birch, LLP

(57) ABSTRACT

Disclosed is a battery module, which includes: a cell assembly composed of pouch cells; a bottom plate configured to support the cell assembly and having slits formed therein at predetermined intervals so that edge portions of the pouch cells are put therein; and a side plate provided perpendicular to a plane of the bottom plate and disposed adjacent to an outermost side of the cell assembly, wherein as the edge portions of the pouch cells are put into the slits of the bottom plate, empty spaces are respectively formed between adjacent edge portions, and wherein the empty spaces are used as a cooling channel.

12 Claims, 5 Drawing Sheets

(51) Int. Cl.
*H01M 2/04* (2006.01)
*H01M 10/04* (2006.01)

(56) References Cited

U.S. PATENT DOCUMENTS

| | | | |
|---|---|---|---|
| 9,876,207 | B2 | 1/2018 | Tokoo et al. |
| 2003/0118898 | A1 | 6/2003 | Kimura et al. |
| 2009/0142653 | A1 | 6/2009 | Okada et al. |
| 2011/0206948 | A1 | 8/2011 | Asai et al. |
| 2011/0212355 | A1 | 9/2011 | Essinger et al. |
| 2012/0045681 | A1 | 2/2012 | Klaus et al. |
| 2012/0301771 | A1* | 11/2012 | Moser ............... H01M 10/625 429/120 |
| 2012/0315529 | A1* | 12/2012 | Jin ..................... H01M 10/647 429/120 |
| 2013/0004822 | A1 | 1/2013 | Hashimoto et al. |
| 2014/0220391 | A1 | 8/2014 | Fujii et al. |
| 2014/0234691 | A1* | 8/2014 | Lee .................. H01M 10/6567 429/120 |
| 2014/0295228 | A1 | 10/2014 | Yan et al. |
| 2016/0149180 | A1* | 5/2016 | Tokoo ................. H01M 2/1077 429/120 |
| 2017/0033419 | A1 | 2/2017 | Eom et al. |
| 2019/0058228 | A1 | 2/2019 | Tasai et al. |

FOREIGN PATENT DOCUMENTS

| | | |
|---|---|---|
| EP | 2 763 214 A1 | 8/2014 |
| JP | 2001-176472 A | 6/2001 |
| JP | 2011-175743 A | 9/2011 |
| JP | 2012-227164 A | 11/2012 |
| JP | 2013/12441 A | 1/2013 |
| JP | 2015-005362 A | 1/2015 |
| JP | 2016-15328 A | 1/2016 |
| KR | 10-0836398 B1 | 6/2008 |
| KR | 10-2011-0130312 A | 12/2011 |
| KR | 10-2012-0137792 A | 12/2012 |
| KR | 10-2014-0034351 A | 3/2013 |
| KR | 10-2013-0086678 A | 8/2013 |
| KR | 10-2013-0105653 A | 9/2013 |
| KR | 10-2014-0147978 A | 12/2014 |
| KR | 10-2015-0118375 A | 10/2015 |
| WO | WO 2013/031613 A1 | 3/2013 |
| WO | WO 2013/072093 A1 | 5/2013 |
| WO | WO 2014203694 * | 12/2014 |
| WO | WO 2016/063434 A1 | 4/2016 |

OTHER PUBLICATIONS

17856749,Decision_to_grant_a_European_patent,Oct. 8, 2020 (Year: 2020).*
International Search Report for PCT/KR2017/010742 (PCT/ISA/210) dated Jan. 11, 2018.

* cited by examiner

BATTERY MODULE HAVING COOLING CHANNEL, AND ASSEMBLING METHOD AND FRAME ASSEMBLY THEREOF

TECHNICAL FIELD

The present application claims priority to Korean Patent Application No. 10-2016-0124854 filed on Sep. 28, 2016 in the Republic of Korea, the disclosures of which are incorporated herein by reference.

The present disclosure relates to a battery module, and more particularly, to a battery module having a cooling channel with an improved structure for allowing a cooling fluid to flow, and an assembling method and a frame assembly thereof.

BACKGROUND ART

Generally, a battery module has a structure including a plurality of cells connected in series and/or in parallel. The battery module generally includes a cell assembly having a plurality of cells arranged and stacked in one direction, and a frame having plates capable of surrounding the cell assembly.

In the conventional battery module, when a cooling channel is separately designed for cooling the battery cells, the space occupied by the cooling channel is separately required, so it is difficult to simplify the structure and there is limit in capacity of cells to be mounted.

In relation to the technology for cooling the battery module, Korean Unexamined Patent Publication No. 2011-0130312 discloses a battery cooling device having a structure in which spaces are formed among a plurality of tubes through which a cooling medium flows, and battery cells and cooling fins are inserted into the spaces not to contact the tubes.

Korean Patent Registration No. 10-0836398 discloses a supporting device for cooling a battery module, which includes a rectifying fin installed in an empty space between neighboring modules accommodated in the case so that a cooling wind introduced through an inlet port may smoothly flow.

In addition, Korean Unexamined Patent Publication No. 2013-0105653 discloses a cooling device for a power battery pack, which includes rubber sheets composed of front and rear covers capable of changing the flow direction of a cooling water so as to give a path for allowing the cooling water to flow throughout the entire array.

Although the above technologies have been proposed, the battery module according to the conventional art has a limitation in securing a space for installing a cooling channel, and a process cost is increased by adding separate components for installing the cooling channel.

DISCLOSURE

Technical Problem

The present disclosure is designed to solve the problems of the related art, and therefore the present disclosure is directed to providing a battery module capable of securing a space for a cooling channel by using a pouch cell built in a battery cell, and an assembling method and a frame assembly thereof.

The present disclosure is also directed to providing a battery module capable of connecting to another battery module by using the cooling channel, and an assembling method and a frame assembly thereof.

Technical Solution

In one aspect of the present disclosure, there is provided a battery module, comprising: a cell assembly composed of pouch cells; a bottom plate configured to support the cell assembly and having slits formed therein at predetermined intervals so that edge portions of the pouch cells are put therein; and a side plate provided perpendicular to a plane of the bottom plate and disposed adjacent to an outermost side of the cell assembly, wherein as the edge portions of the pouch cells are put into the slits of the bottom plate, empty spaces are respectively formed between adjacent edge portions, and wherein the empty spaces are used as a cooling channel.

In the present disclosure, the battery module may further comprise a cooling hose disposed to communicate with the empty space.

In the present disclosure, the battery module may further include a pair of end plates disposed at both ends of the cell assembly, and at any one of the pair of end plates, an end of the cooling hose may be drawn outwards.

In the present disclosure, the cooling hose located at any one battery module may be coupled to the cooling hose located at another battery module so that different modules are connected in series.

In another aspect of the present disclosure, there is also provided a method for assembling a battery module, comprising: (a) preparing a frame assembly, which includes a bottom plate configured to supporting a cell assembly composed of pouch cells and having slits formed therein at predetermined intervals so that edge portions of the pouch cells are put therein, and a side plate provided perpendicular to a plane of the bottom plate and disposed adjacent to an outermost side of the cell assembly; (b) disposing the pouch cells by putting the edge portions of the pouch cells into the slits of the bottom plate; and (c) disposing a cooling hose communicating with empty spaces respectively formed between adjacent edge portions as the edge portions of the pouch cell are put into the slits.

In another aspect of the present disclosure, there is also provided a frame assembly of a battery module, which supports a plurality of pouch cells at an outside of the battery module, the frame assembly comprising: a bottom plate configured to support the pouch cells and having slits formed therein at predetermined intervals so that edge portions of the pouch cells are put therein; and a side plate provided perpendicular to a plane of the bottom plate and disposed adjacent to an outermost side of the cell assembly, wherein as the edge portions of the pouch cells are put into the slits of the bottom plate, empty spaces serving as a cooling channel are respectively formed between adjacent edge portions.

Advantageous Effects

According to the present disclosure, since the space for a cooling channel may be secured between adjacent cells by using the edge structure of the pouch cell included in the battery module, the battery module may have a simplified structure and may be manufactured with lower cost.

In addition, since different modules may be connected back and forth by using a cooling hose, a pack plate for connecting modules is not separately needed.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
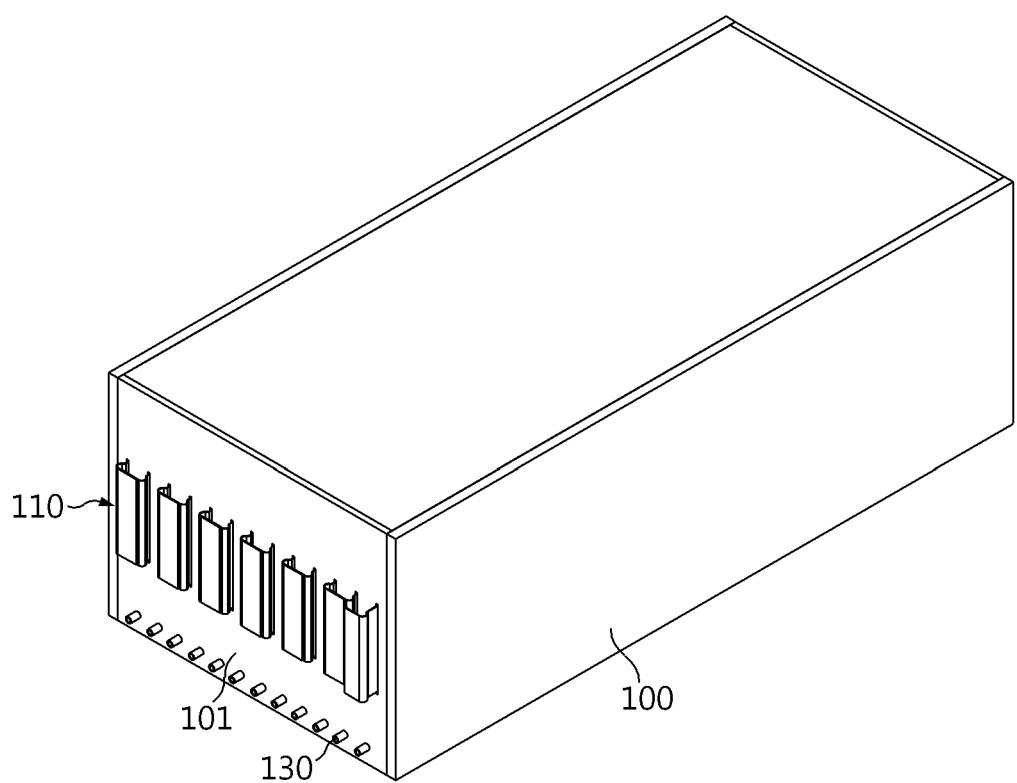
FIG. 1 is a perspective view showing an appearance of a battery module according to an embodiment of the present disclosure.
Figure 2:
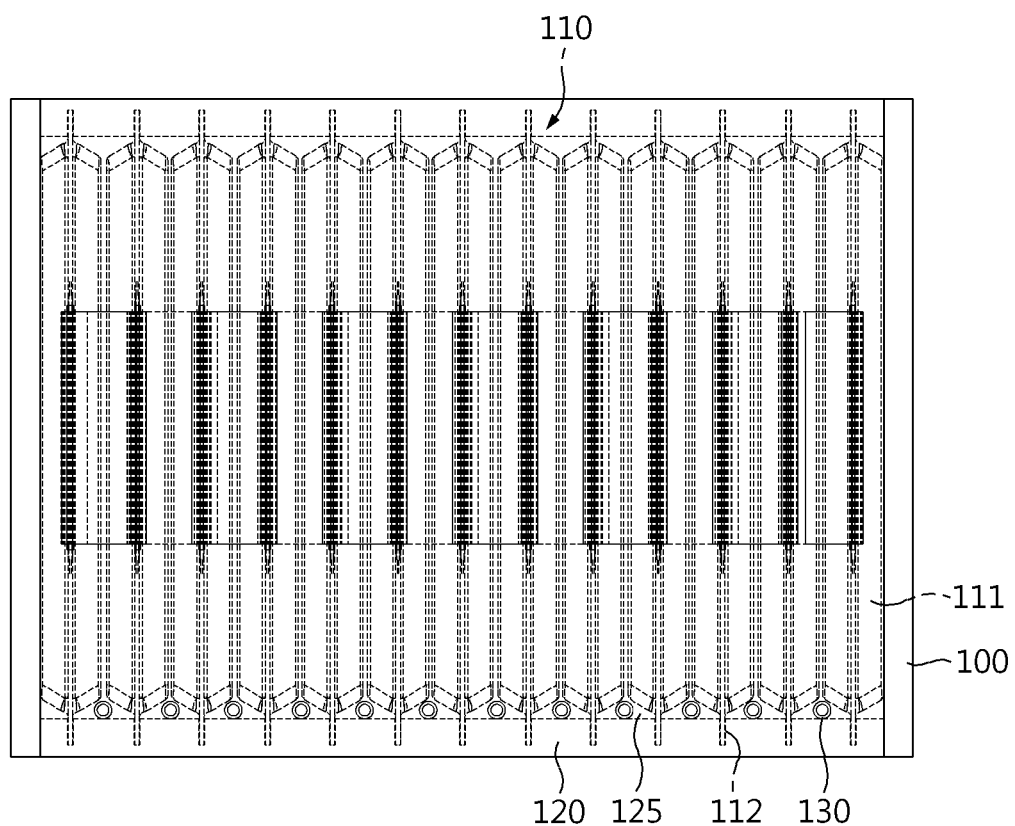
FIG. 2 is a cross-sectioned view of FIG. 1.

FIG. 1 is a perspective view showing an appearance of a battery module according to an embodiment of the present disclosure, and FIG. 2 is a cross-sectioned view of FIG. 1.

Referring to FIGS. 1 and 2, a battery module according to an embodiment of the present disclosure includes a cell assembly 110 composed of a plurality of pouch cells 111, and a frame assembly having a bottom plate 120 into which the pouch cells 111 may be put and a side plate 100 disposed adjacent to an outermost side of the cell assembly 110.

Each pouch cell 111 has a thin plate-like body, in which a positive electrode, a separator and a negative electrode are alternately stacked and an electrode tab is drawn out to at least one side. The positive electrode and the negative electrode are prepared by applying slurry containing an electrode active material, a binder resin, a conductive agent and other additives to at least one side of a current collector. In case of the positive electrode, the electrode active material may employ a general positive electrode active material such as a lithium-containing transition metal oxide, and in the case of the negative electrode, the electrode active material may employ a general negative electrode active material such as a lithium metal, a carbon material, a metal compound, or mixtures thereof, which is capable of intercalating or de-intercalating lithium ions. As the separator, a general porous polymer film used in a lithium secondary battery may be employed.

The electrolyte accommodated in the pouch case together with the electrode assembly may employ a general electrolyte for a lithium secondary battery. The pouch case is made of sheet materials and has an accommodation portion for accommodating the electrode assembly. Preferably, the pouch case is formed by combining a first case and a second case, which are formed by processing a sheet material into a predetermined shape. The sheet material of the pouch case may have a multi-layered structure in which an outer resin layer made provided at an outermost side and made of an insulating material such as polyethylene terephthalate (PET) and nylon, a metal layer made of aluminum capable of maintaining mechanical strength and preventing moisture and oxygen from penetrating, and an inner resin layer made of a polyolefin-based material having thermal adhesiveness to serve as a sealing material are laminated.

The sheet material of the pouch case may include an adhesive resin layer between the inner resin layer and the metal layer and between the outer resin layer and the metal layer, if required. The adhesive resin layer is intended for smooth adhesion between different kinds of materials and is formed as a single layer or multi layers. The adhesive resin layer may be generally made of a polyolefin-based resin, or a polyurethane resin for smooth processing, or a mixture thereof.

In the pouch cell 111, the edge portion 112 corresponds to a flange portion where sealing is performed by thermal compression for efficient bonding of the pouch case. Thus, the edge portion 112 of the pouch cell 111 has a relatively thin thickness compared to a body portion.

The plurality of pouch cells 111 are arranged in one direction to substantially form a stacked structure.

The frame assembly is a structure for accommodating the cell assembly 110 to support and protect the cell assembly 110, and includes a bottom plate 120 located at a lower portion of the cell assembly 110 and a side plate 100 disposed adjacent to an outermost side of the cell assembly 110. Each of the plates 100, 120 of the frame assembly is made by a thin metal plate with a small thickness, such as an aluminum plate.

The bottom plate 120 has a base surface capable of collectively supporting bottom surfaces of the plurality of pouch cells 111. At the base surface of the bottom plate 120, slits are formed at predetermined intervals so that the edge portions 112 of the pouch cells 111 may be inserted therein in a one-to-one relationship with the pouch cells 111. Here, the arrangement direction of the pouch cells 111 and the arrangement direction of the slits coincide with each other.

Figure 4:
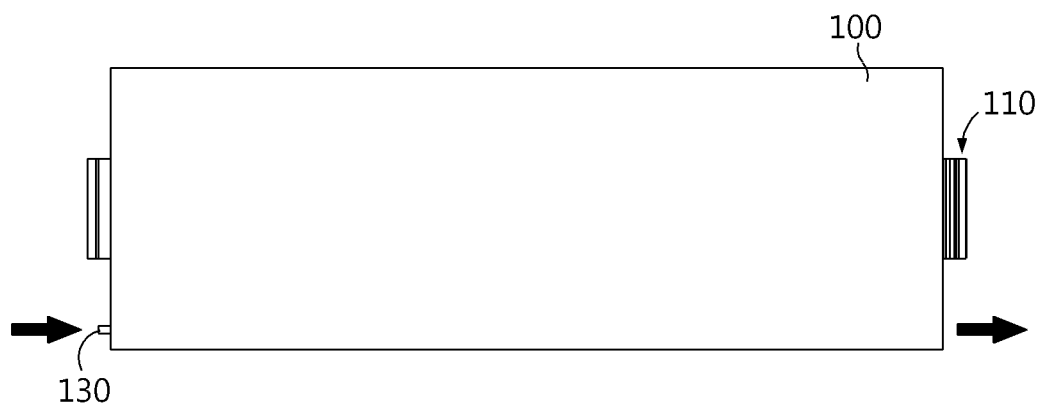
FIG. 4 is a side view of FIG. 1.

As the edge portions 112 of the pouch cells 111 are inserted into the slits of the bottom plate 120, empty spaces 125 are respectively formed between adjacent edge portions 112, and the empty spaces 125 are used as a cooling channel. That is, a cooling fluid such as an insulating oil is supplied into the empty space 125 and cooled from the edge portions of the pouch cells 111. As shown in FIG. 4, the cooling fluid moves along the channel that is continuously formed from one end of the battery module to the other end thereof.

The side plate 100 is made of a metal plate having a relatively small width and a great length and is disposed perpendicular to the plane of the bottom plate 120 and adjacent to the outermost side of the cell assembly 110.

A pair of end plates 101 are disposed at both ends of the frame assembly in a length direction. The pair of end plates 101 are coupled to both sides of the bottom plate 120 and the upper plate in the length direction and to the side plate 100 to support both ends of the pouch cells 111.

At any one end of the pair of end plates 101, an end of a cooling hose 130 is disposed to be drawn outward. The cooling hose 130 is installed to communicate with the empty space 125 in a one-to-one relationship. According to a modified example of the present disclosure, the cooling hose 130 may also be arranged long so as to be longitudinally inserted into each empty space 125.

Figure 3:
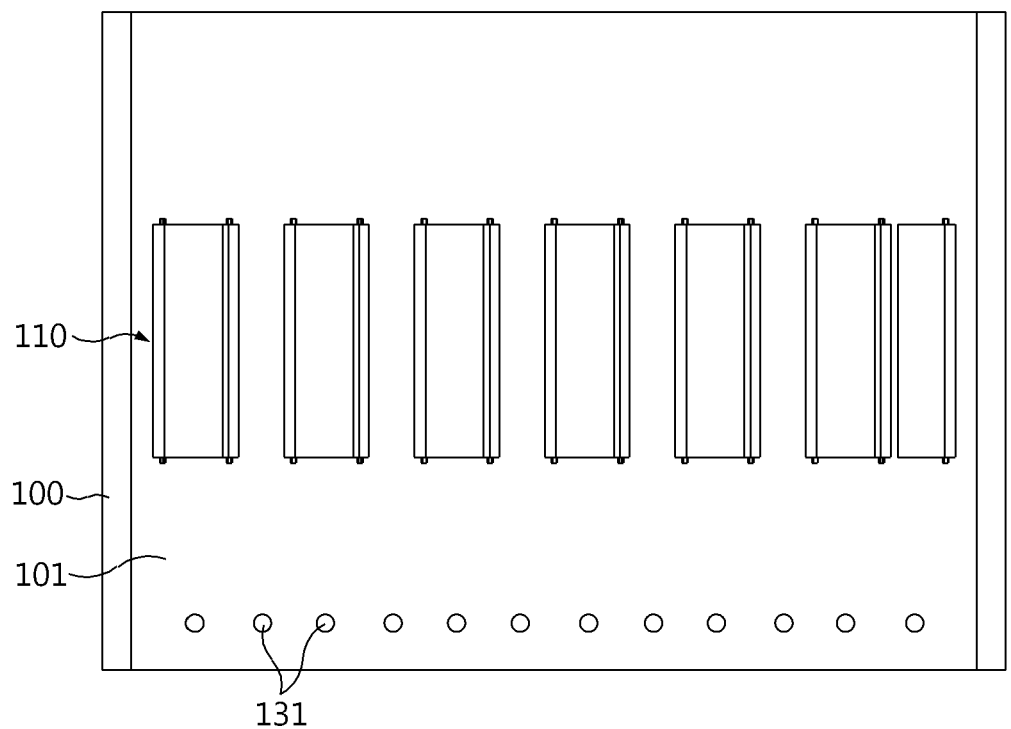
FIG. 3 is a rear view of FIG. 1.

In addition, an insert hole 131 is formed in the other one of the pair of end plates 101, as shown in FIG. 3. The cooling hose 130 may be disposed inside the insert hole 131.

Figure 5:
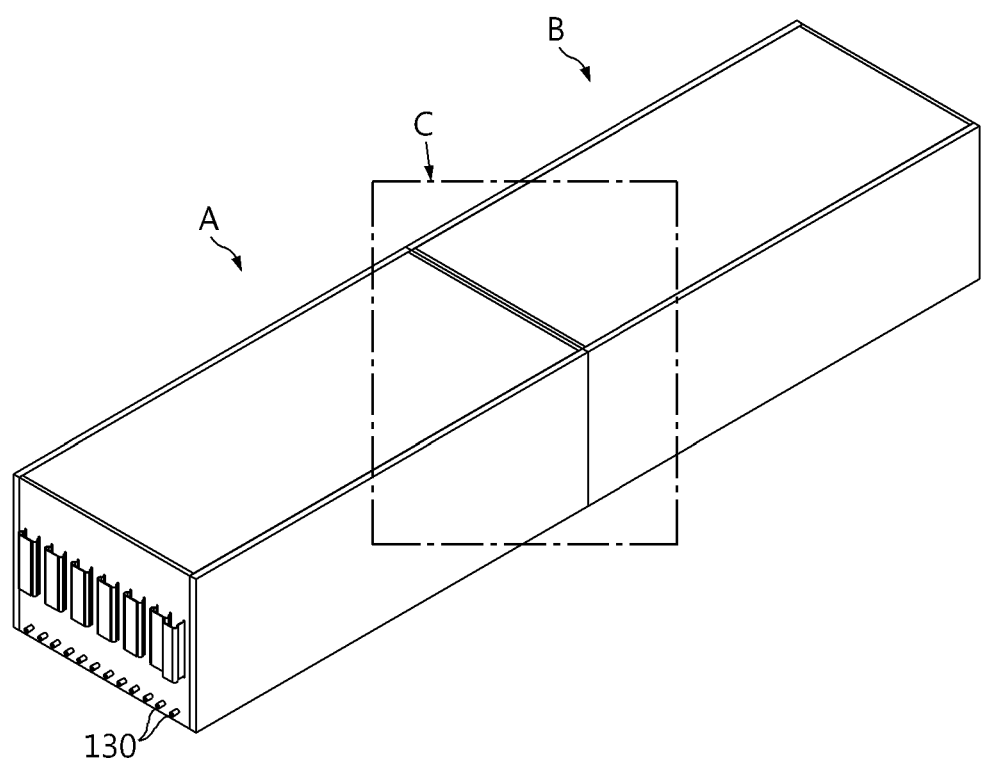
FIG. 5 is a perspective view showing that different battery modules are connected in series.
Figure 6:
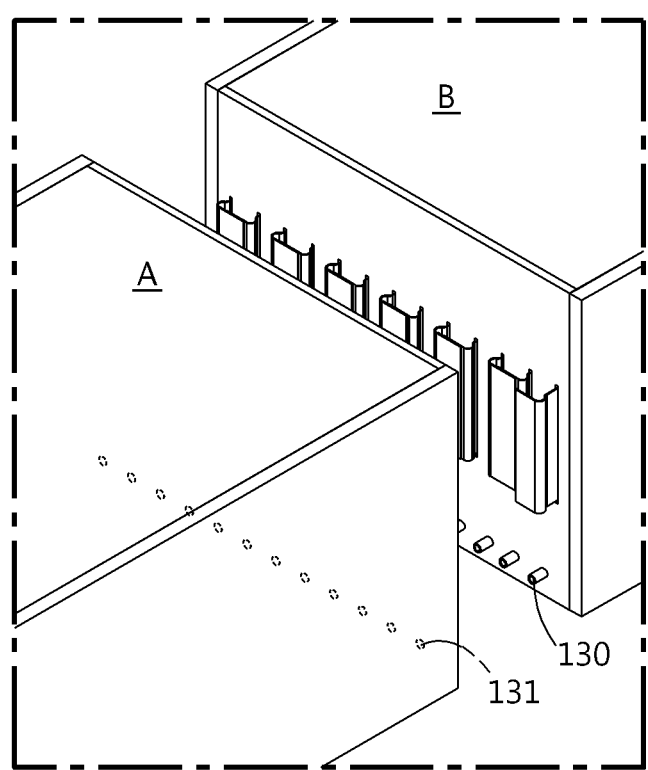
FIG. 6 is an exploded perspective view showing a coupled structure of a portion C in FIG. 5.

As shown in FIG. 5, different battery modules A, B may be used in a state of being connected to each other back and forth to form an assembly. At this time, at a coupling portion C as shown in FIG. 6, the cooling hose 130 located at any one module is inserted into the insert hole 131 formed at another module and connected to the cooling hose 130 of the another module. If different modules are connected back and forth by using the cooling hose 130, there is no need for a separate pack plate for connecting and integrating the modules together.

The battery module according to an embodiment of the present disclosure is assembled so that the frame assembly is combined in the unit of the plurality of pouch cells 111.

The frame assembly includes the bottom plate 120 having slits formed therein and the side plate 100 disposed perpendicular to the bottom plate 120, and the plurality of pouch cells 111 are completely disposed by putting the edge portions 112 of the pouch cells 111 into the slits of the bottom plate 120, respectively, and then sealing the same.

As the edge portions 112 of the pouch cell 111 are put into the slits of the bottom plate 120, empty spaces 125 are respectively formed between adjacent edge portions, and the empty spaces 125 are used as a cooling channel.

If a cooling fluid such as an insulation oil flows through the cooling hose 130 after the assembling is completed, cooling is performed from the edge portions of the pouch cells 111.

INDUSTRIAL APPLICABILITY

If the present disclosure is applied, since the space for a cooling channel may be secured by using the empty spaces naturally formed by disposing the pouch cells, it is possible to make a battery module having a simplified structure and a reduced process cost.

What is claimed is:

1. A battery module, comprising:
a cell assembly composed of pouch cells;
a bottom plate configured to support the cell assembly and having slits formed at a base surface of the bottom plate and at predetermined intervals so that edge portions of the pouch cells are put in the slits; and
a side plate provided perpendicular to a plane of the bottom plate and disposed adjacent to an outermost side of the cell assembly,
wherein as the edge portions of the pouch cells are put into the slits of the bottom plate, empty spaces are respectively formed between adjacent edge portions of adjacent pouch cells,
wherein the empty spaces are used as a cooling channel to contain a cooling fluid that contacts bottom surfaces of the adjacent pouch cells, and the cooling channel directly guides flow of the cooling fluid.

2. The battery module according to claim 1, further comprising:
a cooling hose disposed to communicate with the empty space.

3. The battery module according to claim 2, further comprising:
a pair of end plates disposed at both ends of the cell assembly,
wherein at any one of the pair of end plates, an end of the cooling hose is drawn outwards.

4. The battery module according to claim 1,
wherein the cooling hose located at any one battery module is coupled to the cooling hose located at another battery module so that different modules are connected in series.

5. A method for assembling a battery module, comprising:
(a) preparing a frame assembly, which includes a bottom plate configured to support a cell assembly composed of pouch cells and having slits formed at a base surface of the bottom plate and at predetermined intervals so that edge portions of the pouch cells are put in the slits, and a side plate provided perpendicular to a plane of the bottom plate and disposed adjacent to an outermost side of the cell assembly;

(b) disposing the pouch cells by putting the edge portions of the pouch cells into the slits of the bottom plate; and
(c) disposing a cooling hose communicating with empty spaces respectively formed between adjacent edge portions of adjacent pouch cells as the edge portions of the pouch cell are put into the slits,
wherein the cooling channel contains a cooling fluid that contacts bottom surfaces of the adjacent pouch cells, and the cooling channel directly guides flow of the cooling fluid.

6. The method for assembling a battery module according to claim 5, after the step (a), further comprising:
disposing a pair of end plates adjacent to both ends of the cell assembly,
wherein at any one of the pair of end plates, an end of the cooling hose is drawn outwards.

7. The method for assembling a battery module according to claim 6,
wherein the cooling hose located at any one battery module is coupled to the cooling hose located at another battery module so that different modules are connected in series.

8. A frame assembly of a battery module, which supports a plurality of pouch cells at an exterior of the battery module, the frame assembly comprising:
a bottom plate configured to support the plurality of pouch cells and having slits formed at a base surface of the bottom plate and at predetermined intervals so that edge portions of the pouch cells are put in the slits; and
a side plate provided perpendicular to a plane of the bottom plate and disposed adjacent to an outermost side of the cell assembly,
wherein as the edge portions of the pouch cells are put into the slits of the bottom plate, empty spaces serving as a cooling channel are respectively formed between adjacent edge portions of adjacent pouch cells, and
wherein the cooling channel contains a cooling fluid that contacts bottom surfaces of the adjacent pouch cells, and the cooling channel directly guides flow of the cooling fluid.

9. The frame assembly according to claim 8, further comprising:
a pair of end plates disposed at both ends of the cell assembly,
wherein at any one of the pair of end plates, an end of a cooling hose capable of communicating with the empty spaces serving as a cooling channel is drawn outwards.

10. The battery module according to claim 3, wherein the end of the cooling hose is interposed between the base surface of the bottom plate and the bottom surfaces of the adjacent pouch cells, and
wherein the base surface is an uppermost surface of the bottom plate.

11. The method for assembling a battery module according to claim 6, wherein the end of the cooling hose is interposed between the base surface of the bottom plate and the bottom surfaces of the adjacent pouch cells, and
wherein the base surface is an uppermost surface of the bottom plate.

12. The frame assembly according to claim 9, wherein the end of the cooling hose is interposed between the base surface of the bottom plate and the bottom surfaces of the adjacent pouch cells, and
wherein the base surface is an uppermost surface of the bottom plate.

* * * * *